Dec. 4, 1934.  A. E. DIETZ  1,982,861

SAFETY AUTOMOBILE TIRE

Filed Nov. 13, 1933  6 Sheets-Sheet 1

Dec. 4, 1934.  A. E. DIETZ  1,982,861
SAFETY AUTOMOBILE TIRE
Filed Nov. 13, 1933   6 Sheets-Sheet 3

Dec. 4, 1934. A. E. DIETZ 1,982,861
SAFETY AUTOMOBILE TIRE
Filed Nov. 13, 1933 6 Sheets-Sheet 5

Patented Dec. 4, 1934

1,982,861

UNITED STATES PATENT OFFICE 1,982,861

SAFETY AUTOMOBILE TIRE

Albert E. Dietz, Washington, D. C.

Application November 13, 1933, Serial No. 697,831

14 Claims. (Cl. 152—14)

The invention relates to an automobile tire and more especially to a safety tire for motor driven vehicles.

The primary object of the invention is the provision of a tire of this character wherein by reason of its construction it is more dependable and safe, as in the use thereof an operator of an automobile will be able to remain seated and on the operation of a control the tire will be converted into an anti-skid tire so that on driving through ordinary snow, or on icy roads, or a slippery mud surface the possibility of skidding will be reduced to a minimum.

Another object of the invention is the provision of a tire of this character wherein should the same become punctured or a blow-out occur, the tire will be sustained usable to permit the motor driven vehicle to be driven so as to enable a destination to be reached to permit of the mending of the tire or, in other words, the tire will be prevented from becoming flat resultant from puncture or blow-out.

A further object of the invention is the provision of a tire of this character, wherein the construction thereof is novel in form so as to render the same dependable for usage and safe during travel of a vehicle on slippery surfaces, as well as eliminating the inconvenience ordinarily present when a puncture or blow-out occurs.

A still further object of the invention is the provision of a tire of this character which is comparatively simple in its make-up, thoroughly reliable and efficient in its purposes, strong, durable, and inexpensive to manufacture and install.

With these and other objects in view, the invention consists in the features of construction, combination and arrangement of parts as will be hereinafter more fully described in detail, illustrated in the accompanying drawings, which disclose the preferred embodiment of the invention, and pointed out in the claims hereunto appended.

In the accompanying drawings.

Similar reference characters indicate corresponding parts throughout the several views in the drawings.

Referring to the drawings in detail, particularly the preferred embodiment of the invention, A designates generally a portion of a vehicle wheel of that type common to motor driven vehicles, having at its outer periphery a rim 10, this differing from the conventional rim in that there is formed at opposite sides of the wheel annular channels 11 for receiving correspondingly shaped resilient rings 12 which constitute the base of the shoe B of the tire, these rings 12 being releasable from the rim 10 in any desirable manner.

Yieldably socketed in the rings 12 are the continuous flanges 13 of the resilient metallic frame sections 14 and 15, respectively, of the tire shoe, these being embedded in the rubber body 16 of said shoe and formed into a series of radially disposed spaced spring ribs 17, the body 16 being in two parts meeting each other at the ends of said ribs 17 of the respective sections 14 and 15. The ribs 17 of the section 14, at the tread area of the shoe, carry annular hoops 18, these being spaced apart, and the hoop next to the ribs 17 of the section 15, at intervals thereof, receives locking screws 19, these being engaged in connecting webs 20 joining adjacent ribs 17 of the section 15, the screws 19 having their wrench-engaging heads countersunk in the shoe 16 so as not to protrude from the outer surface thereof. Thus it can be readily seen that by removing the screws 19 the sections 14 and 15 of the frame can be separated for the opening of said frame to permit the introduction of the inner pneumatic tube 21 within the shoe.

The rim 10 has secured to the tire seating side 22 thereof and to the hoops 18 the tubiform sections 23 and 24, respectively, of a sheath for the inner tube 21, these sections working counter to each other in embracing relation to the said inner tube and said sections are in sector assembly, and alternately arranged one with respect to the other between the sectors of said sections 23 and 24 of the sheath are arranged contractible springs 25 so that under relative displacement of said sectors of the sections 23 and 24, these will be tensioned, the displacement being brought about by activity of the tire during travel on irregular surfaces.

Diametrically opposite each other and supported by spring hangers 26 and spring tensioned plungers 27 are metal block-like inserts 28, these having cushions 29, certain of the inserts 28 working between the sections 23 and 24 to prevent the closing in of said sections with respect to each other on deflation of the inner tube 21 while others of these block-like inserts 28 interlock with the said sections 23 and 24 to prevent creeping of the said sections when the inner tube is deflated. It is preferable to have those inserts 28 for preventing creeping carried by the plungers 27, while the other inserts 28 for preventing closing in are carried by the hangers 26. It will be obvious that by reason of the location of certain of the inserts 28 between the sectors of the sections 23 and 24 where the springs 25 are located, will limit the approach of sectors adjacent to each other under traction activity of the tire. The plungers 27 are fitted in the rim 10 and one of the hoops 18, respectively.

Arranged at intervals peripherally about the shoe B preferably diametrically opposite each other are adjustable calks 30, these being grouped in pairs and supported in carriers 31 slidably fitted in guides 32 and 33, respectively, which are disposed transversely with respect to the hoops 18, the carriers being provided with connectors 34 engaging bridge pieces 35, the connectors being slidable upon said pieces and, additionally, such carriers 31 are formed with extensions 36 working through clearances 37 therefor in the outermost hoops 18 so that these carriers with the calks will be firmly slidably fitted. Arranged with relation to the calks 30 and supported by the intermediate hoop 18 are rocking levers 38, each supporting swiveled sleeves 39 at the ends thereof, which sleeves slidably embrace coupling pins 40, these being pivoted to lugs 41 movably engaged in slots 42 formed in the bottoms of the carriers 31. The pins 40 have thereon coiled compression springs 43 working against the sleeves 39 and the pivotal ends of said pins 40. The rocking lever arbor 44 has fixed thereto an arm 45, the same pivoted at 46 to a flexible steel shift link 47 working through guides 48 and a clearance 49, respectively, the latter being provided in the shoe B and opening into a channeled annulus 50 made fast to the shoe B at the inner side of the wheel, in the channel there being arranged a shiftable ring 51 properly interfitted therewith. This ring 51 is slidably joined to the annulus 50 by headed lugs 52 working in slots 53 in the base flange of said annulus 50. The ring 51 is formed with an ear 54 having pivoted thereto the link 55 which is also pivoted at 56 to one end of an expander loop member 57, the other end of the latter having a terminal 58 slidably connected in a slot 59 diagonally formed in the channeled annulus 50. It will be seen that when relative movement of the annulus 50 and the ring 51 takes place the loop member 57 will become shifted in the annulus 50, either expanding or contracting the same, and with this expander loop 57 are engaged the eye ends 60 of the links 47 so that the latter will be actuated for the throwing or adjusting of the calks 30 which, by the working of the rocking lever 38, will be reversely shifted to calking or non-calking position and when in calking position function as anti-skidding mediums.

Pivoted to the ring 51 is a locking dog 61, the same being tensioned by a leaf spring 62 riveted to said ring 51 and this dog is engageable in a slot 63 in the annulus 50 for the locking of said ring and annulus together when relatively moved for the throwing of the calks 30. The annulus 50 has thereon a cam 64 at the slot 63 and the purpose of such cam being hereinafter described in detail.

Mounted on the frame of the motor driven vehicle, at the vertical center with respect to the wheel A, is hand controlled actuator mechanism which comprises a yieldably supported barrel 65, its support being a coiled yieldable spring mount 66 and in which is rotatably and slidably supported a pintle 67 having fixed thereto a bell crank-like arm 68, carrying a roller 69 which, by the shifting of the arm, can be brought into position to engage the dog 61 and the cam 64, the arm being operable from an operating rod 70 which is extended into the body of a motor vehicle within convenient reach of the operator thereof, for hand control. The barrel 65 carries a stop 71 arranged in the path of the arm 68 to limit the throw thereof to operative or inoperative position. Surrounding the pintle 67 and seated upon the barrel 65 is a coiled expansion spring 72 which works against the arm 68 to urge the same to a determined elevation. Connected with the arm 68 is a cable 73, the same being trained over a guide pulley 74 and carried into the vehicle within convenient reach of the driver or operator thereof, the purpose of this cable 73 being hereinafter described.

Arranged at the tread of the shoe B are replaceable tread pieces 75, these being extended between the calks 30 and the same are clamped in place between stationary and movable gripping jaws 76 and 77, respectively, the movable jaws being engaged in suitable recesses 78 formed in the intermediate hoop 18 and having threaded therein clamping bolts 79 which are loosely engaged in the stationary jaws 76 integrally formed with the section 14 of the frame of the shoe, it being obvious that by removal of the bolts 79 the tread pieces 75 can be detached for placement of new ones should the occasion arise.

Figures 27, 28, 29, 30:
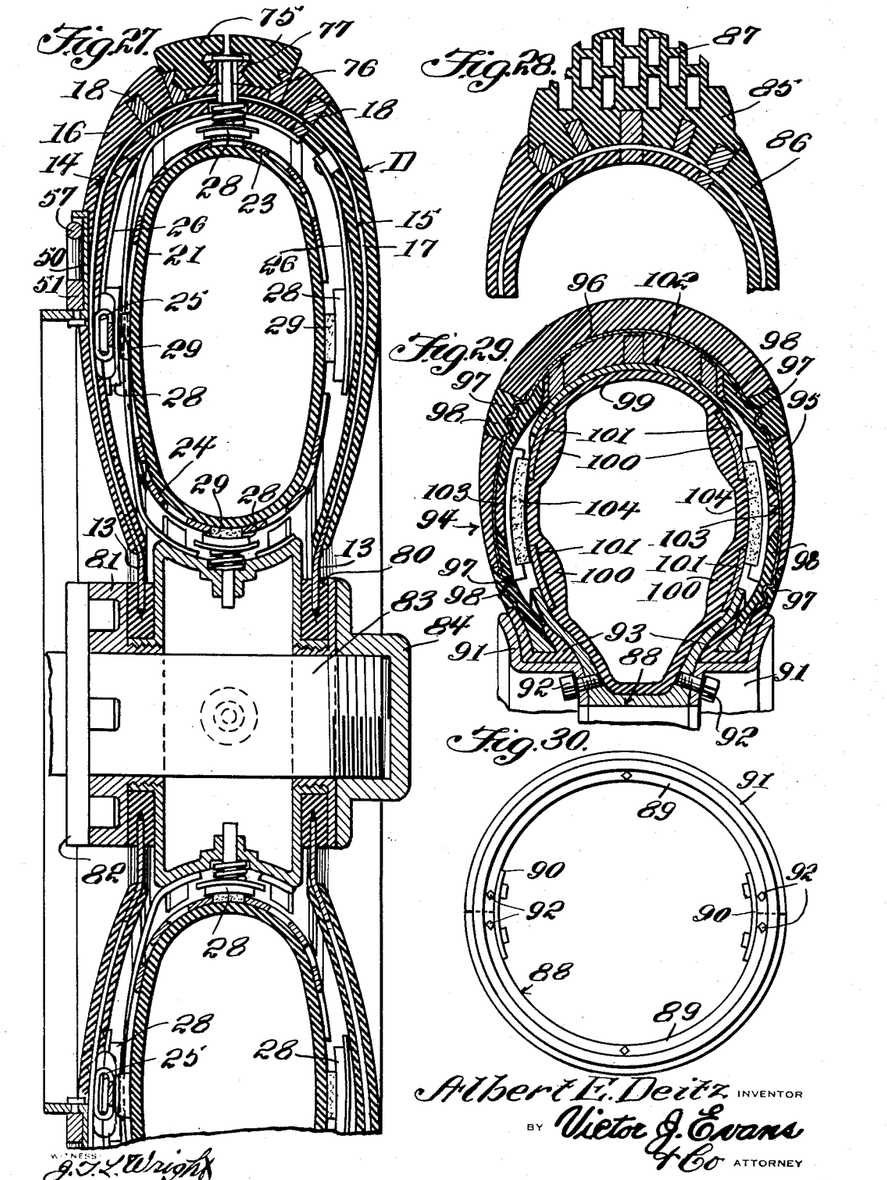
Figure 27 is a fragmentary vertical transverse sectional view through a modified form of tire.
Figure 28 is a fragmentary vertical transverse sectional view through a still further modified form of tire.
Figure 29 is a view similar to Figure 27 showing a still further modification.
Figure 30 is a detail elevation of the rim structure for the modified form shown in Figure 29.

In Figure 27 of the drawings there is shown a modified form of tire mounting, the make-up of the tire D being identical to the construction hereinbefore described except that the resilient rings 80 are removably fitted in a hub 81, the latter being engageable with a clutching head 82 on the axle 83, the hub being slipped over the axle 83 and held engaged with the head 82 by a nut or cap 84 threaded onto said axle, it being understood, of course, that the tire structure is of a size to give the proper spread to the wheel constituted only by the hub and said tire.

In Figure 28 of the drawings there is shown a further modification wherein a tread insert 85 is in the shoe 86 of the tire and has a honeycomb formation 87 for anti-skid purposes.

In Figures 29 and 30 of the drawings there is shown a further modified form wherein the rim for the wheel includes an intermediate channeled annulus 88, this being in two parts 89, these being detachably joined to each other at 90 and the outer bead flanges 91, the latter being detachably secured to the annulus 88 by fasteners 92. The flanges 91 receive the beads 93 of the shoe 94 in the mounting of the latter and this shoe involves the rubber body 95 carrying the lining 96 which has the fluted areas 97 which function in bellow fashion and are crowded by overlying elastic pieces 98 so that the shoe 94 normally will be contracted about the inflated pneumatic inner tube 99, but said shoe can expand under certain conditions, the tube 99 being seated in the annulus 88. The tube 99 is formed with thickened portions 100, these being supplemented at the outer face of the tube by wear rings 101 countersunk in said tube.

Surrounding the tube 99 is a metallic sheath 102, the same overlapping the rings 101 next thereto, while the annulus 88 overlaps the rings 101 next thereto and under this arrangement pinching of the inner tube 99 will be avoided under certain working conditions of the tire.

Located circumferentially at intervals and suitably fixed at opposite sides of the shoe 94 are metallic inserts 103, these having resilient pads 104 which normally contact with the inner tube 99 and on deflation of this tube, while the tire is active, the inserts 103 will work between the annulus 88 and the sheath 102 so as to prevent the collapsing of the tire structure and enabling such tire to be further used notwithstanding the fact that the inner tube has become deflated, there being no collapsing of the tire when said inner tube is deflated. By tread pressure on the tire in the travel thereof upon a road surface the inserts 103 will become engaged between the annulus 88 and the sheath 102 in successive order because by the contact point of the tire upon the road surface the remaining portion of the shoe out of contact will be caused to expand and the bellows portions 97 spreading with the resilient pieces 98 so that the inserts can be readily brought between the said annulus 88 and the sheath notwithstanding the fact that the inner tube 99 has become deflated and thus the tire is still in a condition for service.

It should be readily apparent that by removing the bead flanges 91 from the annulus 88 and separating these parts 89 the tire can be removed from the wheel.

The tire structure constituting the preferred embodiment of the invention as disclosed in Figures 1 to 26 of the drawings, in service, should the inner tube become deflated by reason of a puncture, blow-out or the like, the inserts 28, under the action of the hangers 26 and the plungers 27, will engage between the sections 23 and 24 of the sheath, thus preventing the collapsing of the tire, whereby the said tire is usable for further service irrespective of the fact that the inner tube has become deflated.

Figures 1, 9, 11, 12, 13, 14:
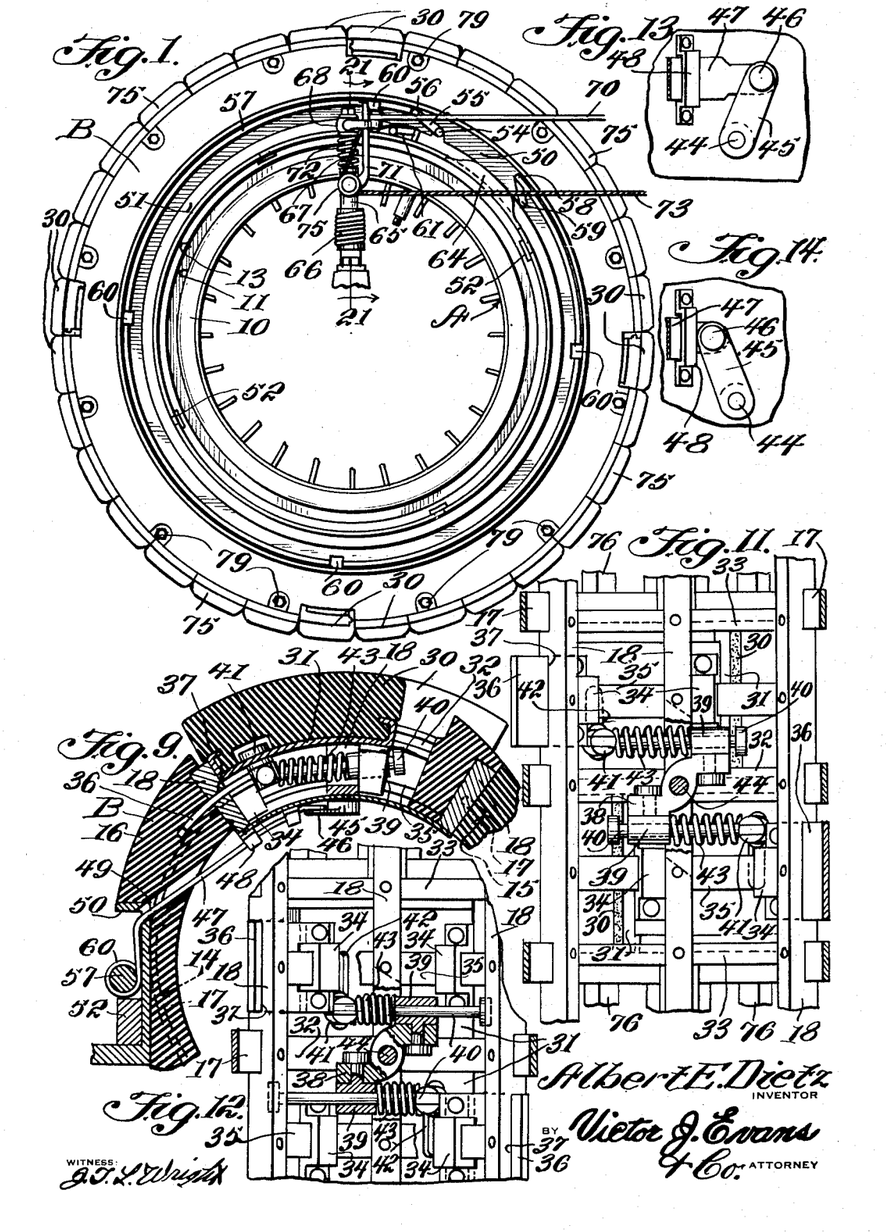
Figure 1 is an elevation looking toward the inner side of a motor driven vehicle wheel, showing the tire constructed in accordance with the invention carried thereby.
Figure 9 is a fragmentary sectional view similar to Figure 4 showing the adjustable calks extended for anti-skid purposes.
Figure 11 is a view similar to Figure 10 showing the calks adjusted or in a position different from the position shown in Figure 10.
Figure 12 is a view similar to Figure 11 with the parts in position as shown in Figure 11, except that the springs are contracted and the calks in extended position.
Figure 13 is a fragmentary detail plan view illustrative of a connection between the calk operating means and the calk adjusting arm, the parts being in normal position.
Figure 14 is a view similar to Figure 13 with the parts shifted from normal position to a position for extending the calks.
Figures 2, 25:
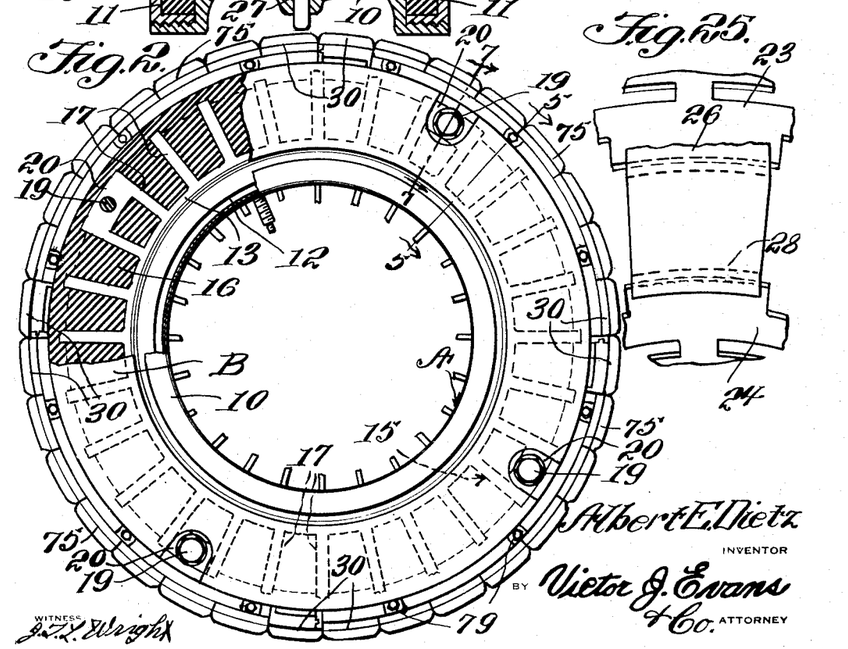
Figure 2 is a view similar to Figure 1 looking toward the outside of the vehicle wheel and the tire and rim of the wheel being partly broken away.
Figure 25 is a fragmentary elevation showing in detail the mounting of a retainer member for preventing collapsing of the tire when the inner tube is deflated.
Figure 3:
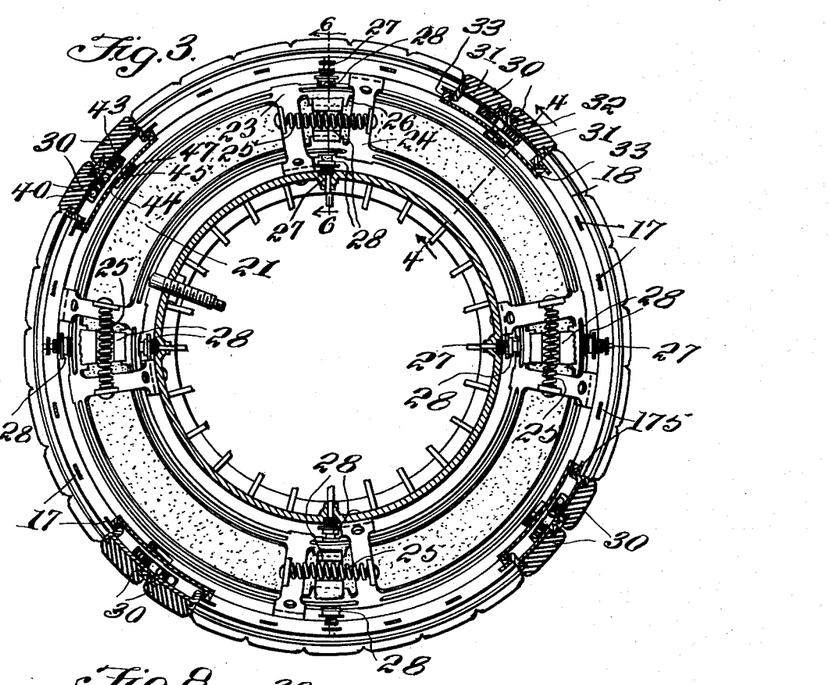
Figure 3 is a vertical sectional view through the wheel and tire.
Figures 4, 5, 10:
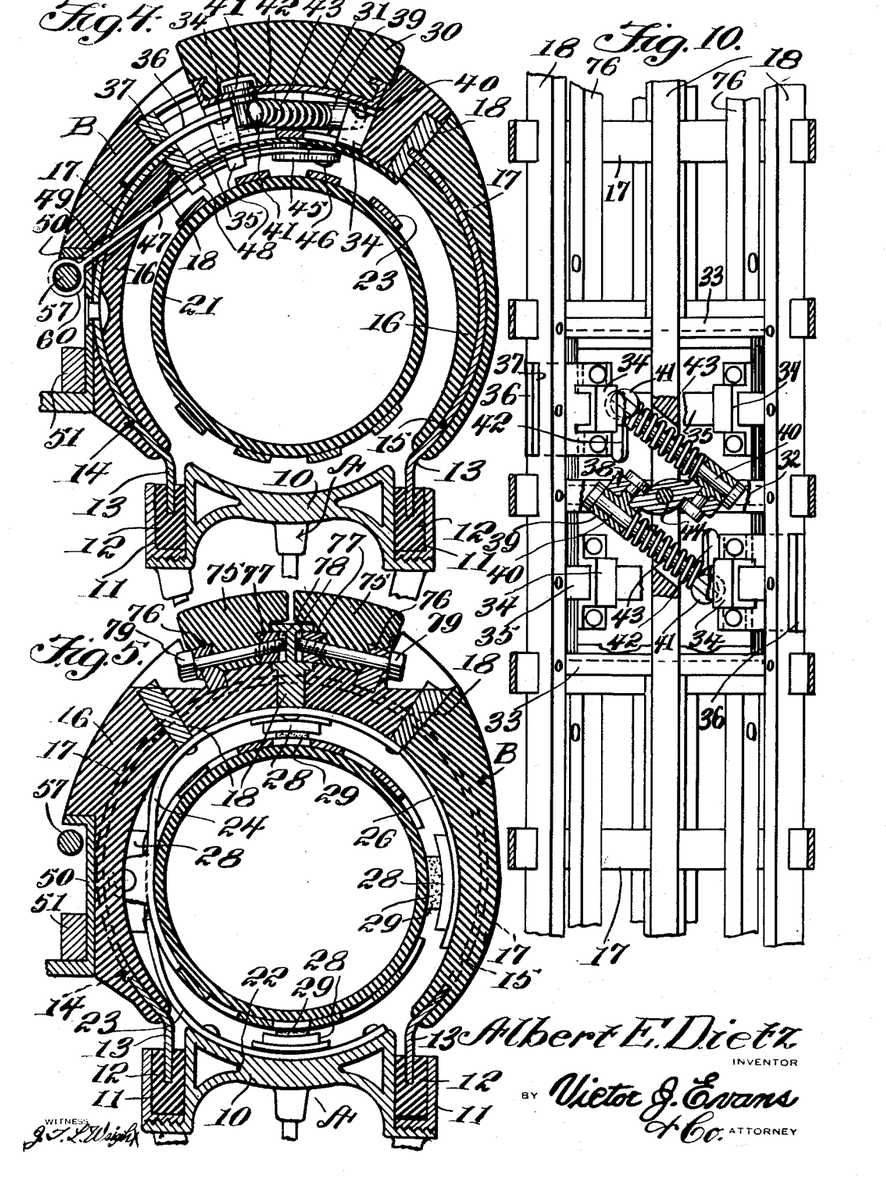
Figure 4 is an enlarged sectional view on the line 4—4 of Figure 3, looking in the direction of the arrows.
Figure 5 is a sectional view on the line 5—5 of Figure 2, looking in the direction of the arrows.
Figure 10 is a fragmentary plan view looking outwardly from the inner side of the tire and partly in section.
Figures 6, 7:
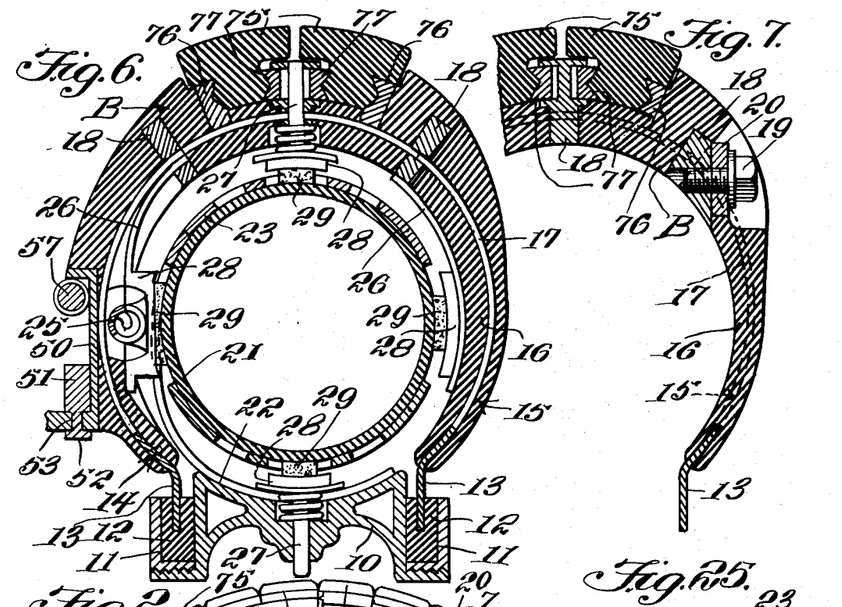
Figure 6 is a sectional view on the line 6—6 of Figure 3, looking in the direction of the arrows.
Figure 7 is a fragmentary sectional view on the line 7—7 of Figure 2, looking in the direction of the arrows.
Figures 8, 26:
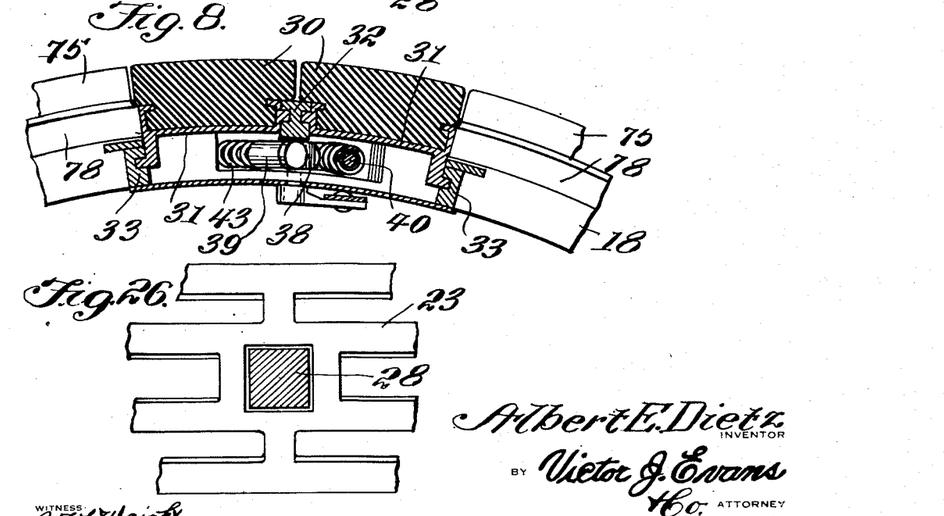
Figure 8 is a fragmentary longitudinal sectional view showing in detail the mounting of the adjustable calks.
Figure 26 is a fragmentary plan view, partly in section, of a cooperating member with the part shown in Figure 25.
Figures 15, 16, 17, 18, 19, 20, 21, 22, 23, 24:
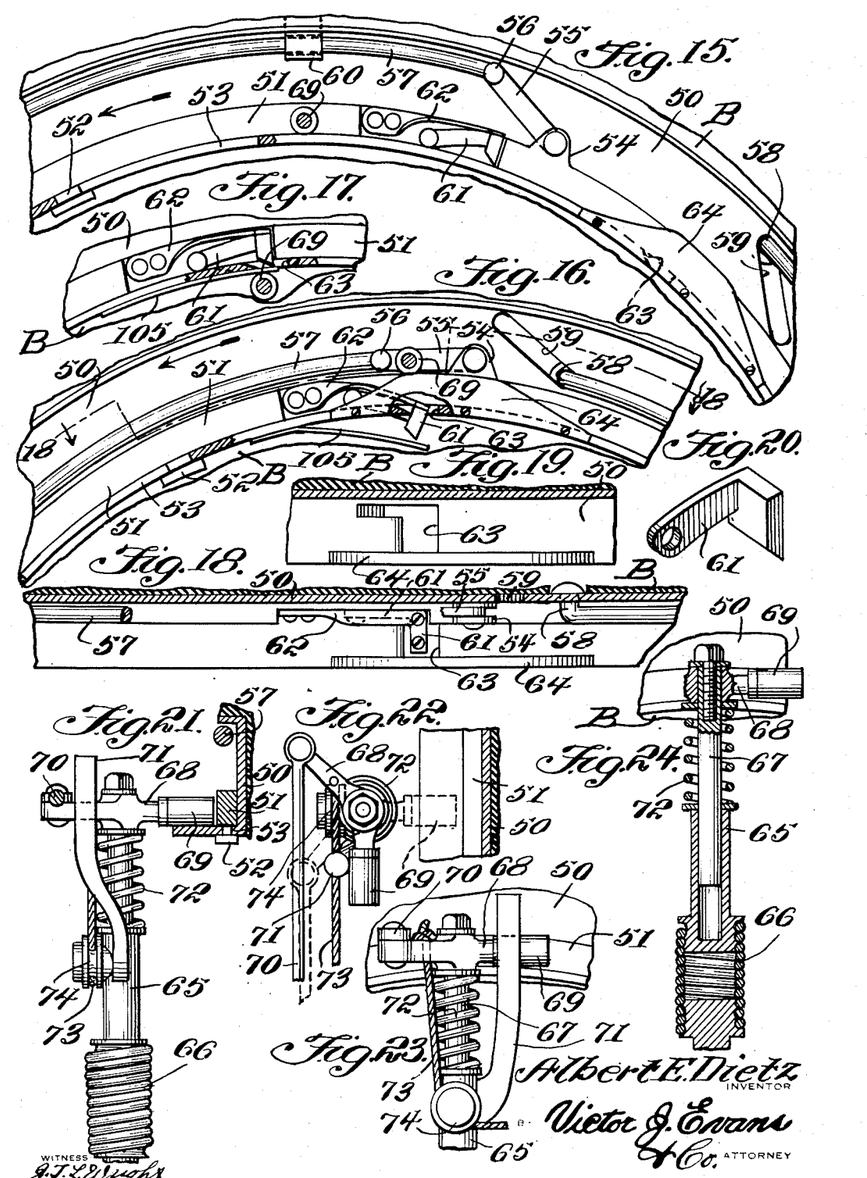
Figure 15 is an enlarged fragmentary elevation of a portion of the operating mechanism for the adjustable calks and in normal position.
Figure 16 is a view similar to Figure 15 showing the mechanism shifted from normal position to a position when the calks are extended.
Figure 17 is a fragmentary elevation showing in detail the release of the dog for the return of the calk operating mechanism to normal position, as shown in Figure 15.
Figure 18 is a fragmentary sectional view on the line 18—18 of Figure 16, looking in the direction of the arrows.
Figure 19 is a fragmentary sectional view of one of the parts of the calk adjusting mechanism.
Figure 20 is a perspective view of the dog of said mechanism.
Figure 21 is a fragmentary detail view partly in elevation and partly in section taken on the line 21—21 of Figure 1, with the parts shifted to operating position.
Figure 22 is a top plan partly in section of the parts shown in Figure 21, showing by full lines the normal position and by dotted lines the shifted position.
Figure 23 is a fragmentary elevation of the parts shown in Figures 21 and 22.
Figure 24 is a vertical longitudinal sectional view thereof.

Should the driver of the automobile equipped with the tire desire to travel upon a snow or ice covered roadbed or a slippery mud surface it will be only necessary that the speed of travel of the automobile be reduced to about five miles per hour and then the said driver pulls upon the control rod 70, it being understood, of course, that prior thereto the calks 30 are in normal non-calking position, the pull upon the rod throwing the lever 68 to the dotted line position shown in Figure 22, placing the roller 69 in the path of the dog 61 so that when the wheel A rotates it will cause the roller 69 to engage with the dog 61, thereby holding the ring 51 momentarily stationary, which causes action upon the expanding member 57 to have it contract and under this action the links 47 will be operated, turning the arbor of the lever 38 which, through the pins 40, will throw the calks 30 to calking position or laterally of the tire and such calks of each pair being reversely shifted. Concurrently with the action of the roller 69 on the dog 61 the latter will have become depressed to engage in the opening 63, thus locking the ring 51 with the annulus 50 so that the said calks will remain in their thrown calking position and the roller 69 will travel upon the cam 64 over and away from the dog 61 and when the operator releases pull upon the rod 70 the lever 68 will instantly return to normal position away from the annulus 50, contacting with the stop 71. This lever 68, when thrown to a position in the path of the dog 61, will also engage the stop 71, limiting the movement of said lever.

When it becomes necessary to retract the calks 30 from their thrown or shifted position the operator again pulls the rod 70 and also the cable 73 which causes the lowering of the lever 68 and the shifting thereof beneath the lowermost flange of the annulus 50 so that the roller 69 will engage with a lifting spring 105 against which rests the dog 61 when engaged in the opening 63 in said annulus, causing this dog to be released from the opening 63, thereby freeing the ring 51 so that by the action of the springs 43 the calks 30 will be automatically contracted or returned to normalcy within the area of the tread of the tire. On releasing pull upon the rod 70 the lever 68 will return to normalcy, it being understood, of course, that the expanding member 57 in the annulus 50 reacts to expanded position when the said calks 30 are returned to normalcy.

It should be clearly apparent that the tire in its assembly and in use is dependable and safe as it enables the operator of an automobile to remain seated in the driver's seat and by operating the rod 70, which is within easy reach, to transform the tire so that it will track on snow or ice covered roadways or a slippery mud surface and reduce skidding to a minimum. Further, should the inner tube of the tire become deflated the latter is prevented from becoming flat or collapsing and thus assuring further service to the tire, particularly in reaching a destination.

In event that the calks 30 should be resisted in the adjustment thereof to calking position the springs 43 will compensate for such resistance as the same will be compressed against the action of the sleeves 39 when the lever 38 is rocked, so that in this manner the parts operated upon by the roller 69 on the lever 68 will not become damaged nor will damage occur at the mountings of the said calks.

Incident to the travel of the wheel it will be apparent that the impact is absorbed at the high side of the wheel diametrically opposite the contact area of said wheel as the sections 23 and 24 at the contact side of the wheel spread laterally under compression, while the sections 23 and 24 at the higher or uppermost point of the wheel have a tendency to come together or close in with respect to each other, thereby absorbing the shocks and jars incident to the travel of the wheel, thus functioning as a shock absorber.

It will also be apparent that in event the inner tube is partially deflated the tread of the shoe remains in normalcy due to the sections 23 and 24 which have a tendency to hold the shoe in its spread condition.

From the foregoing it is thought that the construction and manner of operation of the tire will be clearly understood and, therefore, a more extended explanation has been omitted. Further, changes, variations and modifications are contemplated as fall within the scope of the appended claims without departing from the spirit of the invention or sacrificing any of its advantages.

What is claimed is:

1. In a vehicle wheel tire, a shoe having removable tread sections, adjustable calks between the sections and movable to calking position, and means carried by the shoe for shifting the calks.

2. In a vehicle wheel tire, a shoe having removable tread sections, adjustable calks between the sections and movable to calking position, means carried by the shoe for shifting the calks, and means manually controlled from a driver's vehicle seat and operative upon said means for actuating the same when the tire is in motion.

3. In a vehicle wheel tire, a shoe, an inner tube in said shoe, a sectional sheath embracing said tube, one section being fixed to the tube and the other section fixed to a wheel, and pressure regulated inserts on the shoe and engageable between the sections of the sheath to prevent the collapsing of the tire on the deflation of said inner tube.

4. In a vehicle wheel tire, a shoe, an inner tube in said shoe, a sectional sheath embracing said tube, one section being fixed to the tube and the other section fixed to a wheel, pressure regulated inserts on the shoe and engageable between the sections of the sheath to prevent the collapsing of the tire on the deflation of said inner tube, and removable tread sections at the tread portion of the shoe.

5. In a vehicle wheel tire, a shoe, an inner tube in said shoe, a sectional sheath embracing said tube, one section being fixed to the tube and the other section fixed to a wheel, pressure regulated inserts on the shoe and engageable between the sections of the sheath to prevent the collapsing of the tire on the deflation of said inner tube, removable tread sections at the tread portion of the shoe, and calks between said sections and arranged to be moved from the tread portion of the shoe to calking position.

6. In a vehicle wheel tire, a shoe, an inner tube in said shoe, a sectional sheath embracing said tube, one section being fixed to the tube and the other section fixed to a wheel, pressure regulated inserts on the shoe and engageable between the sections of the sheath to prevent the collapsing of the tire on the deflation of said inner tube, removable tread sections at the tread portion of the shoe, calks between said sections and arranged to be moved from the tread portion of the shoe to calking position, and means operative upon said calks to shift the same.

7. In a vehicle wheel tire, a shoe, an inner tube in said shoe, a sectional sheath embracing said tube, one section being fixed to the tube and the other section fixed to a wheel, pressure regulated inserts on the shoe and engageable between the sections of the sheath to prevent the collapsing of the tire on the deflation of said inner tube, removable tread sections at the tread portion of the shoe, calks between said sections and arranged to be moved from the tread portion of the shoe to calking position, means operative upon said calks to shift the same, and manually operated means actuated from within a vehicle for controlling the last-named means during the travel of the tire.

8. In a vehicle wheel tire, a shoe, an inner tube in said shoe, a sectional sheath embracing said tube, one section being fixed to the tube and the other section fixed to a wheel, pressure regulated inserts on the shoe and engageable between the sections of the sheath to prevent the collapsing of the tire on the deflation of said inner tube, removable tread sections at the tread portion of the shoe, calks between said sections and arranged to be moved from the tread portion of the shoe to calking position, means operative upon said calks to shift the same, manually operated means actuated from within a vehicle for controlling the last-named means during the travel of the tire, and means coacting with the last-named means to reset the sheath means.

9. In a vehicle wheel tire, a shoe, an inner tube in said shoe, a sectional sheath embracing said tube, one section being fixed to the tube and the other section fixed to a wheel, pressure regulated inserts on the shoe and engageable between the sections of the sheath to prevent the collapsing of the tire on the deflation of said inner tube, removable tread sections at the tread portion of the shoe, calks between said sections and arranged to be moved from the tread portion of the shoe to calking position, means operative upon said calks to shift the same, manually operated means actuated from within a vehicle for controlling the last-named means during the travel of the tire, means coacting with the last-named means to reset the sheath means, and spring supports for the inserts and moving the same between the sections of the sheath to prevent collapsing of the tube.

10. In a vehicle wheel tire, a shoe, an inner tube in said shoe, a sectional sheath embracing said tube, one section being fixed to the tube and the other section fixed to a wheel, pressure regulated inserts on the shoe and engageable between the sections of the sheath to prevent the collapsing of the tire on the deflation of said inner tube, removable tread sections at the tread portion of the shoe, calks between said sections and arranged to be moved from the tread portion of the shoe to calking position, means operative upon said calks to shift the same, manually operated means actuated from within a vehicle for controlling the last-named means during the travel of the tire, means coacting with the last-named means to reset the sheath means, spring supports for the inserts and moving the same between the sections of the sheath to prevent collapsing of the tube, and yieldably connected beads on the shoe and fitted with a rim of a vehicle wheel.

11. In a vehicle wheel tire, a shoe, an inner tube in said shoe, a sectional sheath embracing said tube, one section being fixed to the tube and the other section fixed to a wheel, pressure regulated inserts on the shoe and engageable between the sections of the sheath to prevent the collapsing of the tire on the deflation of said inner tube, removable tread sections at the tread portion of the shoe, calks between said sections and arranged to be moved from the tread portion of the shoe to calking position, means operative upon said calks to shift the same, manually operated means actuated from within a vehicle for controlling the last-named means during the travel of the tire, means coacting with the last-named means to reset the sheath means, spring supports for the inserts and moving the same between the sections of the sheath to prevent collapsing of the tube, yieldably connected beads on the shoe and fitted with a rim of a vehicle wheel, and sectional spring frames embedded in the shoe and separable circumferentially thereof, the shoe being formed in sections and separable circumferentially of the same.

12. In a vehicle wheel tire, a shoe, an inner tube in said shoe, a sectional sheath embracing said tube, one section being fixed to the tube and the other section fixed to a wheel, pressure regulated inserts on the shoe and engageable between the sections of the sheath to prevent the collapsing of the tire on the deflation of said inner tube, removable tread sections at the tread portion of the shoe, calks between said sections and arranged to be moved from the tread portion of the shoe to calking position, means operative upon said calks to shift the same, manually operated means actuated from within a vehicle for controlling the last-named means during the travel of the tire, means coacting with the last-named means to reset the sheath means, spring supports for the inserts and moving the same between the sections of the sheath to prevent collapsing of the tube, yieldably connected beads on the shoe and fitted with a rim of a vehicle wheel, sectional spring frames embedded in the shoe and separable circumferentially thereof, the shoe being formed in sections and separable circumferentially of the same, and means for detachably joining the sections of the shoe with each other at the meeting of the frame sections embedded therein.

13. In a vehicle wheel tire, a shoe, an inner tube in said shoe, a sectional sheath embracing said tube, one section being fixed to the tube and the other section fixed to a wheel, pressure regulated inserts on the shoe and engageable between the sections of the sheath to prevent the collapsing of the tire on the deflation of said inner tube, removable tread sections at the tread portion of the shoe, calks between said sections and arranged to be moved from the tread portion of the shoe to calking position, means operative upon said calks to shift the same, manually operated means actuated from within a vehicle for controlling the last-named means during the travel of the tire, means coacting with the last-named means to reset the sheath means, spring supports for the inserts and moving the same between the sections of the sheath to prevent collapsing of the tube, yieldably connected beads on the shoe and fitted with a rim of a vehicle wheel, sectional spring frames embedded in the shoe and separable circumferentially thereof, the shoe being formed in sections and separable circumferentially of the same, means for detachably joining the sections of the shoe with each other at the meeting of the frame sections embedded therein, and annular hoops carried by one of the frame sections and embedded in the shoe.

14. In a vehicle wheel tire, a shoe, an inner tube in said shoe, a sectional sheath embracing said tube, one section being fixed to the tube and the other section fixed to a wheel, pressure regulated inserts on the shoe and engageable between the sections of the sheath to prevent the collapsing of the tire on the deflation of said inner tube, removable tread sections at the tread portion of the shoe, calks between said sections and arranged to be moved from the tread portion of the shoe to calking position, means operative upon said calks to shift the same, manually operated means actuated from within a vehicle for controlling the last-named means during the travel of the tire, means coacting with the last-named means to reset the sheath means, spring supports for the inserts and moving the same between the sections of the sheath to prevent collapsing of the tube, yieldably connected beads on the shoe and fitted with a rim of a vehicle wheel, sectional spring frames embedded in the shoe and separable circumferentially thereof, the shoe being formed in sections and separable circumferentially of the same, means for detachably joining the sections of the shoe with each other at the meeting of the frame sections embedded therein, annular hoops carried by one of the frame sections and embedded in the shoe, and means for clamping the sections of the tread within the shoe.

ALBERT E. DIETZ.